United States Patent
Nishida

(10) Patent No.: US 9,051,894 B2
(45) Date of Patent: Jun. 9, 2015

(54) CONTROL DEVICE FOR INTERNAL COMBUSTION ENGINE

(75) Inventor: Kentaro Nishida, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 109 days.

(21) Appl. No.: 13/977,483

(22) PCT Filed: Jan. 20, 2011

(86) PCT No.: PCT/JP2011/051021
§ 371 (c)(1),
(2), (4) Date: Jun. 28, 2013

(87) PCT Pub. No.: WO2012/098671
PCT Pub. Date: Jul. 26, 2012

(65) Prior Publication Data
US 2013/0289851 A1    Oct. 31, 2013

(51) Int. Cl.
*F02D 13/04* (2006.01)
*F02D 41/40* (2006.01)
*F02D 13/02* (2006.01)
*F02D 41/38* (2006.01)
*F02D 41/00* (2006.01)

(52) U.S. Cl.
CPC .............. *F02D 41/40* (2013.01); *F02D 13/02* (2013.01); *F02D 41/3836* (2013.01); *F02D 2041/001* (2013.01); *Y02T 10/18* (2013.01); *F02D 13/0215* (2013.01)

(58) Field of Classification Search
CPC .............. F01L 13/065; F01L 2800/00; F02M 63/0225; F02M 69/54; F02M 37/0029
USPC .............. 123/321, 345–348, 90.15, 445,446, 123/457, 511
See application file for complete search history.

(56) References Cited

U.S. PATENT DOCUMENTS

| | | | |
|---|---|---|---|
| 6,055,948 A * | 5/2000 | Shiraishi et al. | 123/90.15 |
| 2005/0000486 A1* | 1/2005 | Kuzuyama et al. | 123/299 |
| 2006/0060162 A1* | 3/2006 | Fukui et al. | 123/179.16 |
| 2006/0130806 A1* | 6/2006 | Tsunooka et al. | 123/316 |
| 2006/0168944 A1* | 8/2006 | Inoue et al. | 60/284 |
| 2007/0089697 A1* | 4/2007 | Hara et al. | 123/90.15 |
| 2012/0239276 A1* | 9/2012 | Nishiumi | 701/103 |

FOREIGN PATENT DOCUMENTS

| | | |
|---|---|---|
| JP | 11-082074 A | 3/1999 |
| JP | 2005-220757 A | 8/2005 |
| JP | 2006-037847 A | 2/2006 |
| JP | 2008-121494 A | 5/2008 |
| JP | 2009-002180 A | 1/2009 |
| JP | 2010-138743 A | 6/2010 |

* cited by examiner

*Primary Examiner* — John Kwon
(74) *Attorney, Agent, or Firm* — Sughrue Mion, PLLC

(57) ABSTRACT

An ECU 70A is applied to an internal combustion engine 50 of in-cylinder injection type equipped with a fuel injection valve 56 that injects fuel into a combustion chamber E, an intake valve 54 and an exhaust valve 55 provided for the combustion chamber E, and VVTs 57 and 58 that cause the intake valve 54 and the exhaust valve 55 to overlap each other. In a case where the VVTs 57 and 58 cause the intake valve 54 and the exhaust valve 55 to overlap each other to thereby scavenge the combustion chamber E, the ECU 70A sets the injection pressure of fuel injected by the fuel injection valve 56 lower than that for a case where the intake valve 54 and the exhaust valve 55 are not caused to overlap each other.

4 Claims, 5 Drawing Sheets

1ST MAP DATA M1
(BASE INJECTION
PRESSURE)

2ND MAP DATA M2'
(INJECTION PRESSURE AT
THE TIME OF
STRENGTHENING SWIRL
FLOW)

3RD MAP DATA M3
(BASE PILOT INJECTION
AMOUNT)

4TH MAP DATA M4
(INJECTION AMOUNT AT THE
TIME OF STRENGTHENING
SWIRL FLOW)

CONTROL DEVICE FOR INTERNAL COMBUSTION ENGINE

CROSS REFERENCE TO RELATED APPLICATIONS

This application is a National Stage of International Application No. PCT/JP2011/051021 filed Jan. 20, 2011, the contents of which are incorporated herein by reference in their entirety.

TECHNICAL FIELD

The present invention relates to control devices for internal combustion engines, and more particularly, to a control device for an internal combustion engine applied to an internal combustion engine of in-cylinder injection type.

BACKGROUND ART

Arts that may be considered as being relevant to the present invention are disclosed in Patent Documents 1 through 3 as arts that relate to fuel injection carried out in the internal combustion engine of in-cylinder injection type. Patent Document 1 discloses an art in which the fuel injection pressure is increased when the intake ratio of air compressed by a scavenging pump to cylinder is low. Patent Document 2 discloses an art in which the fuel injection pressure is increased in a case where the fuel injection timing is in the intake stroke and the amount of valve overlapping between an intake valve and an exhaust valve is larger than or equal to a predetermined value. Patent Document 3 discloses an art in which the fuel injection duration is set so as not to overlap with a high swirl period during which the swirl ratio is higher than or equal to a predetermined value.

PRIOR ART DOCUMENTS

Patent Documents

Patent Document 1: Japanese Patent Application Publication No. 2005-220757
Patent Document 2: Japanese Patent Application Publication No. 2006-37847
Patent Document 3: Japanese Patent Application Publication No. 2009-2180

SUMMARY OF THE INVENTION

Problems to be Solved by the Invention

In the internal combustion engine, the flow state of gas in a cylinder can be changed by varying the valve timing of an intake valve or an exhaust valve by a valve system. For example, the gas flow state may be changed so as to scavenge the combustion chamber by causing the intake valve and the exhaust valve to overlap each other at the time of acceleration of the internal combustion engine. Also, in a case where a swirl flow is formed in the combustion chamber, the gas flow state may be changed so as to strengthen the swirl flow by advancing the opening timing of the intake valve when the internal combustion engine is under partial load.

However, in the in-cylinder fuel injection type of internal combustion engine, the arrangement of fuel spray may become different from a desired one by changing the gas flow state in the cylinder. Specifically, for example, scavenging of the combustion chamber reduces combustion gas that remains in the combustion chamber. Thus, the temperature in the cylinder decreases, and the penetration force of the fuel spray becomes stronger as the fuel injected into the cylinder is harder to evaporate. As a result, the arrangement of fuel spray may be different from the desired arrangement. Even in a case where the swirl flow is strengthened, the arrangement of fuel spray is influenced, and therefore, may become different from the desired arrangement. The arrangement of fuel spray that is different from the desired one may degrade fuel economy, for example.

The present invention takes the above problems into consideration, and aims at providing a control device for an internal combustion engine capable of appropriately arranging fuel spray at the time of scavenging by operation of a valve system or strengthening the swirl flow by operation of the valve system.

Means for Solving the Problems

The present invention is a control device for an internal combustion engine applied to an internal combustion engine of in-cylinder injection type equipped with a fuel injection valve that injects fuel into a combustion chamber, an intake valve provided for the combustion chamber, and a valve system capable of changing an opening timing of the intake valve, a swirl flow being formed in the combustion chamber, the control device including an injection pressure setting part that sets, in a case where the valve system advances the opening timing of the intake vale to thereby strengthen the swirl flow, injection pressure of fuel injected by the fuel injection valve lower than that for a case where the opening time of the intake valve is not advanced.

The present invention may be structured so that the injection pressure setting part sets the injection pressure of fuel injected by the fuel injection valve higher as the degree of advance of the opening timing of the intake valve is larger.

The present invention is a control device for the internal combustion engine according to claim 1 or 2, further comprising an injection amount setting part that sets, in a case where the fuel injection valve performs a main injection and a pilot injection prior to the main injection and the valve system advances the opening timing of the intake valve to thereby strengthen the swirl flow formed in the combustion chamber, an amount of fuel injected in the pilot injection larger than that for a case where the opening timing of the intake valve is not advanced.

Effects of the Invention

According to the present invention, it is possible to appropriately arrange the fuel spray at the time of scavenging by an operation of the valve system or strengthening the swirl flow by an operation of the valve system.

MODES FOR CARRYING OUT THE INVENTION

Embodiments of the invention are described by using the drawings.

Embodiment 1

Figure 1:
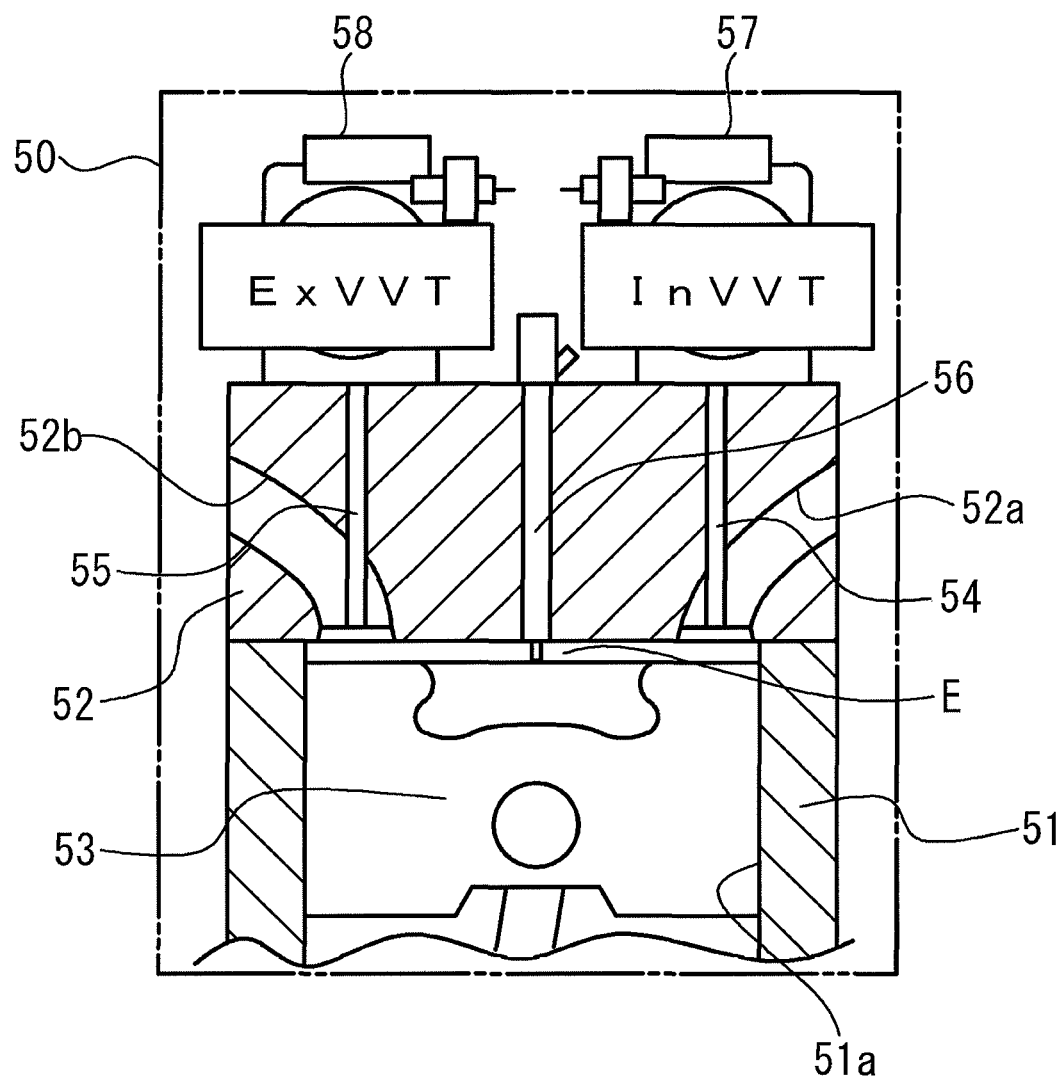
FIG. 1 is a diagram of an outlined structure of an internal combustion engine.

FIG. 1 is a diagram of an outlined structure of an internal combustion engine 50. The internal combustion engine 50 is of in-cylinder fuel type, and is specifically a compression ignition internal combustion engine. However, the present invention is not limited to the above, but may be a spark ignition internal combustion engine, for example. The internal combustion engine 50 has a cylinder block 51, a cylinder head 52, a piston 53, an intake valve 54, an exhaust valve 55, a fuel injection valve 56, an intake-side VVT (Variable Valve Timing) 57, and an exhaust-side VVT 58.

A cylinder 51a is formed in the cylinder block 51. A piston 53 is accommodated in the cylinder 51a. The cylinder head 52 is fixed to the upper surface of the cylinder block 51. A combustion chamber E is formed as a space defined by the cylinder block 51, the cylinder head 52 and the piston 53.

An intake port 52a and an exhaust port 52b are formed in the cylinder head 52. Further, the intake valve 54 and the exhaust valve 55 are provided. The intake port 52a introduces intake air to the combustion chamber E, and the exhaust port 52b exhausts gas from the combustion chamber E. The intake valve 54 opens and closes the intake port 52a, and the exhaust valve 55 opens and closes the exhaust port 52b.

The cylinder head 52 is provided with the fuel injection valve 56, the intake-side VVT 57, and the exhaust-side VVT 58. The fuel injection valve 56 directly injects fuel in the cylinder (combustion chamber E). The fuel injection valve 56 injects fuel radially. The fuel injection valve 56 is not necessarily required to eject fuel radially. The intake-side VVT 57 changes the valve timing of the intake valve 54. The exhaust-side VVT 58 changes the valve timing of the exhaust valve 55. The VVTs 57 and 58 correspond to a valve system capable of causing the intake valve 54 and the exhaust valve 55 to overlap each other. The valve system may be at least either one of the VVT 57 or 58.

Figure 2:
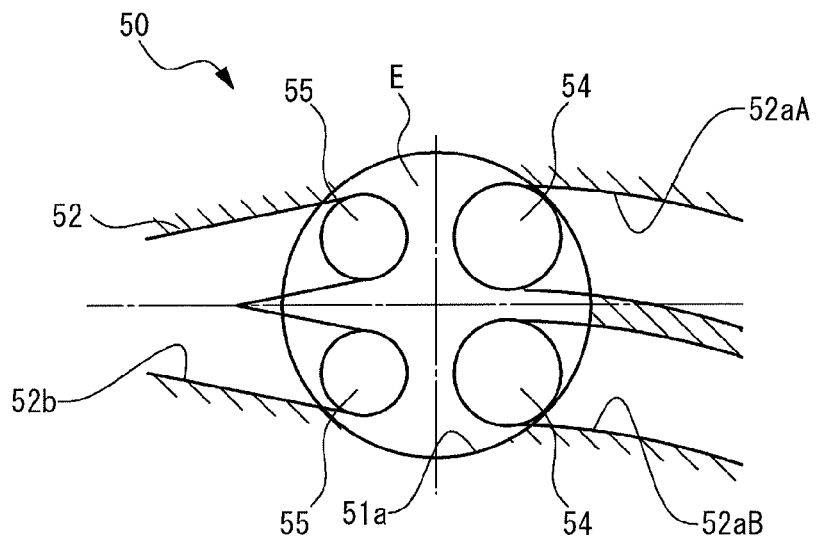
FIG. 2 is a diagram of a valve arrangement of the internal combustion engine.

FIG. 2 is a diagram of a valve arrangement of the internal combustion engine 50. The internal combustion engine 50 is equipped with intake ports 52aA and 52aB as the intake port 52a. The intake ports 52aA and 52aB are a tangential port and a helical port, for example. The intake ports 52aA and 52aB are intake air introduction means that introduces air to generate a swirl flow in the combustion chamber E. Thus, the internal combustion engine 50 is an internal combustion engine in which the swirl flow is formed in the combustion chamber E. For example, the intake air introduction means may be an intake port with a flow control valve capable of generating a swirl flow.

Figure 3:
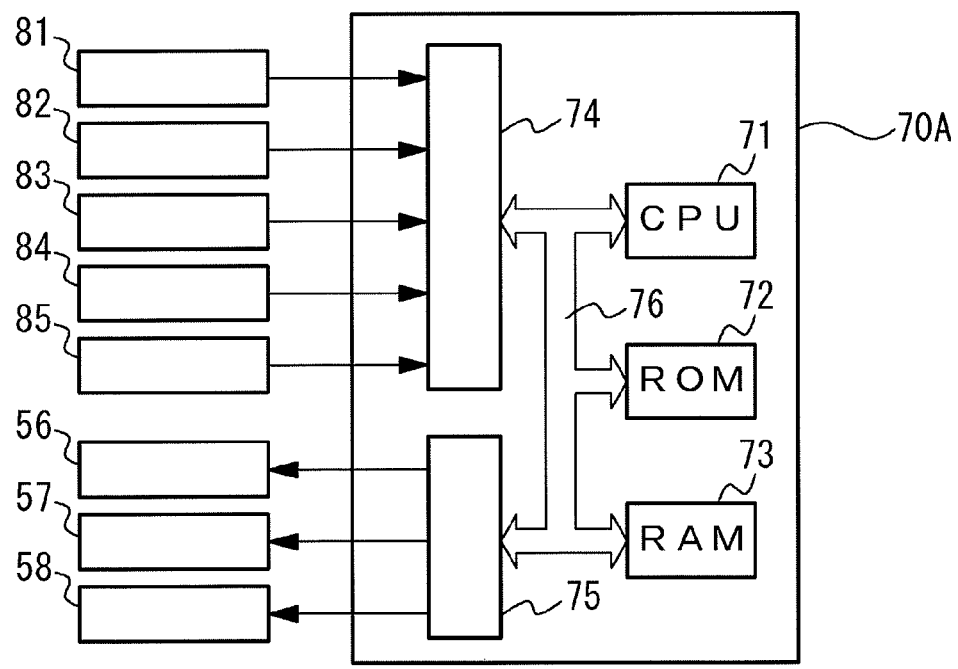
FIG. 3 is a diagram of an outlined structure of an ECU.

FIG. 3 is a diagram of an outlined structure of an ECU 70A. The ECU 70A is applied to the internal combustion engine 50. The ECU 70A is an electronic control unit, and is equipped with a microcomputer composed of a CPU 71, a ROM 72, a RAM 73, and input/output circuits 74 and 75. These components are interconnected via a bus 76.

Various sensors and switches are electrically connected to the ECU 70A. Specifically, electrically connected are an air flow meter 81 for measuring an intake air amount Q of the internal combustion engine 50, a crank angle sensor 82 for detecting the crank angle and the speed Ne of the internal combustion engine 50, an accelerator position sensor 83 for detecting the position of an accelerator pedal (not illustrated) that is acceleration request means for requesting acceleration of the internal combustion engine 50, a valve timing sensor 84 for detecting the valve timing of the intake valves 54, and a valve timing sensor 85 for detecting the valve timing of the exhaust valves 55. Further, various control objects such as the fuel injection valve 56 and the VVTs 57 and 58 are electrically connected to the ECU 70A.

The ROM 72 is configured to store programs that describe various processes executed by the CPU 71 and map data. The ECU 70A realizes various functional parts in such a manner that the CPU 71 executes processes in accordance with the programs stored in the ROM 72 while using a temporary storage area of the RAM 73 as necessary.

For example, in a case where the VVTs 57 and 58 make valve overlapping between the intake valves 54 and the exhaust valves 55 to scavenge the combustion chamber E, the ECU 70A realizes an injection pressure setting part that sets the injection pressure of fuel injected by the fuel injection valve 56 lower than that set in another case where the intake valves 54 and the exhaust valves 55 are caused not to overlap each other. Specifically, the injection pressure setting part is realized to equalize common injection pressure setting conditions and to set the fuel injection pressure lower than that set in the case where the intake valves 54 and the exhaust valves 55 are caused not to overlap each other.

Specifically, the common injection pressure setting conditions are operating states of the internal combustion engine 50 (here, the intake air amount Q and the engine speed Ne). In scavenging of the combustion chamber E, the VVTs 57 and 58 are capable of causing the intake valves 54 and the exhaust valves 55 to overlap each other at the time of acceleration of the internal combustion engine 50, for example.

Figure 4A:
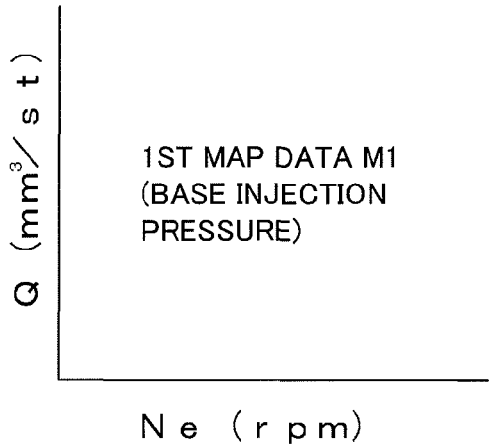
FIG. 4 is a diagram of map data of injection pressure in Embodiment 1.
Figure 4B:
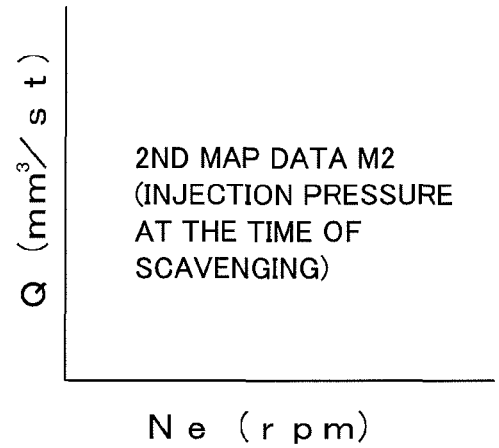

FIG. 4 is a diagram that illustrates map data M1 and M2 owned by the ECU 70A. FIG. 4(a) shows first map data M1, and FIG. 4(b) show second map data M2. The injection pressure that is set by the injection pressure setting part is predetermined by the map data M1 and M2. The first map data M1 defines an injection pressure that is the base injection pressure in accordance with the intake air amount Q and the engine speed Ne. The second map data M2 sets the injection pressure in scavenging in accordance with the intake air amount Q and the engine speed Ne. The map data M1 and M2 are set so that the injection pressure defined by the second map data M2 is lower than that defined by the first map data M1 in a case where the intake air amounts Q are equal to each other and the engine speeds Ne are equal to each other.

Specifically, the injection pressure setting part is realized as follows. The injection pressure setting part refers to the first map data M1 by the intake air amount Q and the engine speed Ne in the case where the VVTs 57 and 58 do not cause the intake valves 54 and the exhaust valves 55 to overlap each other. Then, the injection pressure setting part reads the corresponding injection pressure, and sets the read injection pressure. In the case where the VVTs 57 and 58 cause the intake valves 54 and the exhaust valves 55 to overlap with each other, the injection pressure setting part refers to the second map data M2 by the intake air amount Q and the engine speed Ne. Then, the injection pressure setting part reads the corresponding injection pressure, and sets the read injection pressure.

By the way, it is possible to set, in the second map data M2, an injection pressure in a case where the amount of overlapping between the intake valves 54 and the exhaust valves 55 is equal to a predetermined amount of valve overlapping. In this regard, the injection pressure setting part may be realized to reduce the pressure of fuel injected by the fuel injection valve 56 as the amount of valve overlapping between the intake valves 54 and the exhaust valves 55 increases. For example, the injection pressure setting part may be realized as follows.

That is, in a case where the amount of valve overlapping is larger than the predetermined amount of valve overlapping, the injection pressure setting part changes the injection pressure that is read from the second map data M2 to a lower level as the amount of valve overlapping is larger, and sets the changed injection pressure in the fuel injection pressure. In another case where the mount of valve overlapping is smaller than the predetermined amount of valve overlapping, the injection pressure setting part changes the injection pressure that is read from the second map data M2 to a higher level as the amount of valve overlapping is smaller, and sets the changed injection pressure in the fuel injection pressure.

In the process of changing the injection pressure to a higher level as the amount of valve overlapping is smaller, the injection pressure may be changed to a higher level as far as the changed injection pressure does not extend over the injection pressure set in the first map data M1 specified by the same intake air amount Q and the same engine speed Ne. The ECU 70A corresponds to a control device of the internal combustion engine.

Figure 5:
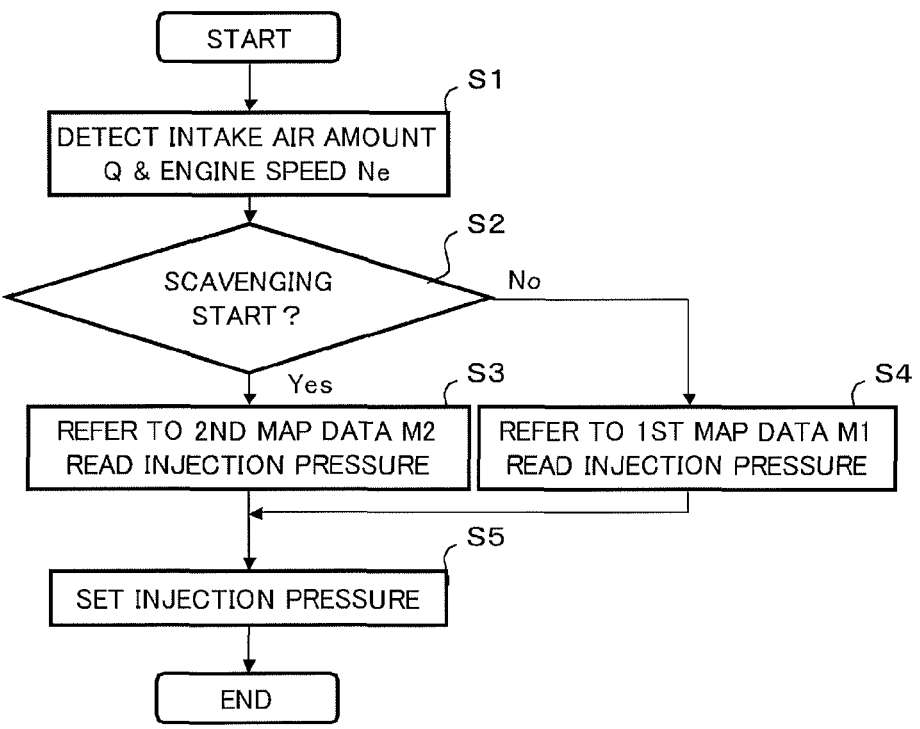
FIG. 5 is a flowchart of a first operation.

Next, a description is given of a first operation that is an operation of the ECU 70A with reference to a flowchart of FIG. 5. The ECU 70A detects the intake air amount Q and the engine speed Ne (step S1). Next, the ECU 70A determines whether scavenging is started (step S2). A determination as to whether scavenging is started may be made by determining whether the VVTs 57 and 58 cause the intake valves 54 and the exhaust valves 55 to overlap each other at the time of acceleration of the internal combustion engine 50 on the basis of the outputs of the accelerator position sensor 83 and the valve timing sensors 84 and 85.

When a negative determination is made at step S2, the ECU 70A refers to the first map data M1 with the detected intake air amount Q and engine speed Ne, and reads the corresponding injection pressure (step S4). When a positive determination is made at step S2, the ECU 70A refers to the second map data M2 with the detected intake air amount Q and the engine speed Ne, and reads the corresponding injection pressure (step S3). Step S3 or S4 is followed by a step at which the ECU 70A sets the injection pressure read at step S3 or that read at step S4 in the fuel injection pressure (step S5).

In a case whereas the amount of valve overlapping between the intake valves 54 and the exhaust valves 55 is larger, the injection pressure of fuel injected by the fuel injection valve 56 is set lower, subsequent to the process of step S3, the ECU 70A may change the fuel injection pressure read from the second map data M2 based on the amount of valve overlapping in step S3, and sets the changed fuel injection pressure at step S5.

Figure 6A:
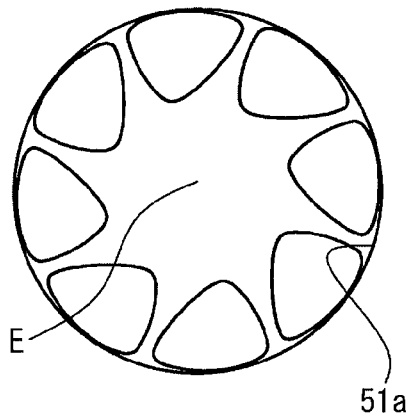
FIG. 6 is a diagram of fuel sprays at the time of scavenging.
Figure 6B:
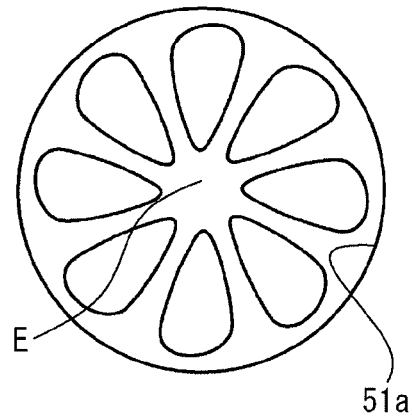

Now, functions and effects of the ECU 70A are described. FIG. 6 is a diagram that explains fuel sprays at the time of scavenging. FIG. 6(a) illustrates a fuel spray in the case where the injection pressure read from the first map data M1 is set in the fuel injection pressure at the time of scavenging. FIG. 6(b) illustrates a fuel spray in the case where the injection pressure read from the second map data M2 is set in the fuel injection pressure at the time of scavenging.

At the time of scavenging, a reduction in the in-cylinder residual gas incurs a decrease in the in-cylinder temperature, which incurs a delay in evaporation of fuel, so that the penetration force of the fuel spray can be strengthened. Therefore, as shown in FIG. 6(a), when the injection pressure read from the first map data M1 is set in the fuel injection pressure at the time of scavenging, the fuel spray injected radially is arranged unevenly in the proximity of outer circumferential portion of the combustion camber E. As a result, an increase of smoke due to fuel-richer mixed gas or an increase in the cooling loss due to quenching of the mixed gas are incurred.

In contrast, the ECU 70A sets the injection pressure read from the second map data M2 in the fuel injection pressure in the case where the VVTs 57 and 58 cause the intake valves 54 and the exhaust valves 55 to overlap each other to thereby scavenge the combustion chamber E. Thus, the fuel injection pressure is set low, as compared with the case where the intake valves 54 and the exhaust valves 55 are not caused to overlap each other (in the case where the injection pressure read from the first map data M1 is set). It is thus possible for the ECU 70A to appropriately arrange the fuel spray at the time of scavenging by the operation of the VVTs 57 and 58, as illustrated in FIG. 6(b). Specifically, the smoke and cooling loss can be reduced.

The ECU 70A is also capable of more appropriately arranging the fuel spray in accordance of the degree of scavenging by lowering the injection pressure of fuel injected by the fuel injection valve 56 as the amount of valve overlapping between the intake valves 54 and the exhaust valves 55 is increased. It is thus possible to more appropriately arrange the fuel spray at the time of scavenging.

In the internal combustion engine 50, the combustion chamber E is scavenged greatly at the time of acceleration by causing the intake valves 54 and the exhaust valves 55 to overlap each other by the VVTs 57 and 58. In the scavenging of the combustion chamber E, the process of causing the intake valves 54 and the exhaust valves 55 to overlap each other by the VVTs 57 and 58 at the time of acceleration of the internal combustion engine 50 is preferably applied to the ECU 70A.

Embodiment 2

An ECU 70B involved in the present embodiment is substantially the same as the ECU 70A except that the injection pressure setting part is realized as indicated below and an injection amount setting part is further realized. Therefore, an illustration of the ECU 70B is omitted. The ECU 70B may be applied to the internal combustion engine 50 instead of the ECU 70A. In the internal combustion engine 50 to which the ECU 70B is applied, the intake-side VVT 57 corresponds to a valve system capable of changing the opening timing of the intake valves 54.

The ECU 70B realizes the injection pressure setting part as described below. That is, in a case where the intake-side VVT 57 advances the opening timing of the intake valves 54 to strengthen the swirl flow formed in the combustion chamber E, the injection pressure setting part makes the injection pressure of fuel injected by the fuel injection valve 56 higher than that in another case where the opening timing of the intake valves 54 is not advanced. Specifically, the injection pressure setting part is realized to make the fuel injection pressure higher than that in the case where the common injection pressure setting conditions are equal to each other and the intake-side VVT 57 does not advance the opening timing of the intake valves 54.

The common injection pressure setting conditions are operating states of the internal combustion engine 50 (here, the intake air amount Q and the engine speed Ne). In the process of strengthening the swirl flow, in a case where the internal combustion engine 50 is under partial load including at least medium load, the intake-side VVT 57 is capable of advancing the opening timing of the intake valves 54.

Figure 7A:
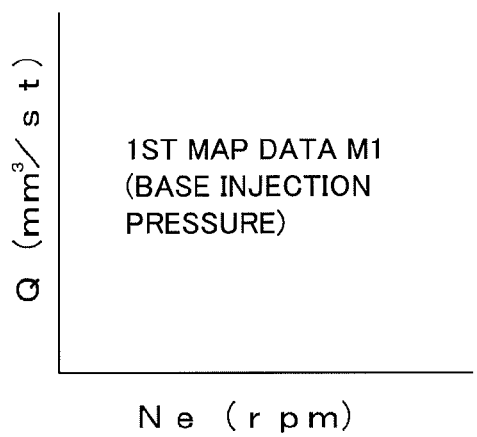
FIG. 7 is a diagram of map data of injection pressure in Embodiment 2.
Figure 7B:
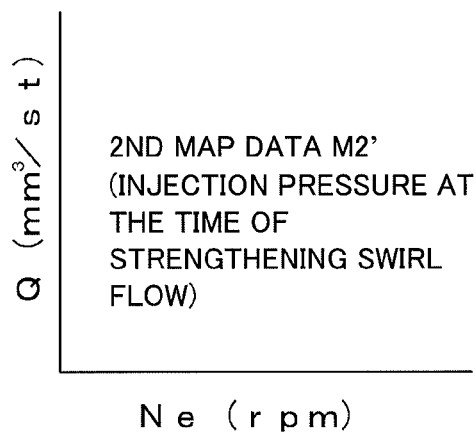

FIG. 7 is a diagram of map data M1 and M2' owned by the ECU 70B. FIG. 7(*a*) shows first map data M1, and FIG. 7(*b*) shows second map data M2'. The injection pressure set by the injection pressure setting part is specifically predetermined by the map data M1 and M2'. The first map data M1 has been described in Embodiment 1. The second map data M2' sets an injection pressure specified by the intake air amount Q and the engine speed Ne at the time of strengthening the swirl flow. The map data M1 and M2' are designed so that the injection pressure defined by the second map data M2' is higher than that in the first map data M1 for the equal intake air amounts Q and the equal engine speeds Ne.

In this regard, specifically, the injection pressure setting part is realized as described below. That is, the injection pressure setting part refers to the first map data M1 with the intake air amount Q and the engine speed Ne in the case where the intake-side VVT 57 does not advance the opening timing of the intake valves 54. Then, the corresponding injection pressure is read and set. In the case where the intake-side VVT 57 advances the opening timing of the intake valves 54, the injection pressure setting part refers to the second map data M2' with the intake air amount Q and the engine speed Ne. Then, the corresponding injection pressure is read and is set.

By the way, it is possible to set, in the second map data M2', an injection pressure for a case where the amount of advance of the opening timing of the intake valves 54 is a predetermined amount of advance. The fuel pressure setting part is further capable of increasing the injection pressure of fuel injected by the fuel injection valve 56 as the amount of advance of the opening timing of the intake valves 54 increases. The above fuel pressure setting part may be realized as described below.

That is, in the case where the amount of advance is larger than the predetermined amount of advance, the injection pressure setting part changes the injection pressure read from the second map data M2' to a higher level as the amount of advance is larger, and sets the changed injection pressure in the fuel injection pressure. In the case where the amount of advance is smaller than the predetermined amount of advance, the injection pressure setting part changes the injection pressure read from the second map data M2' to a lower level as the amount of advance is smaller, and sets the changed injection pressure in the fuel injection pressure. In the process of changing the injection pressure read from the second map data M2' to a lower level as the amount of advance is smaller, it is possible to change the injection pressure to a lower level as far as the changed injection pressure is lower than the injection pressure defined in the first map data M1 with the same intake air amount Q and the engine speed Ne.

The injection mount setting part is realized to perform a main injection and a pilot injection prior to the main injection through the fuel injection valve 56, and is, in a case where the intake-side VVT 57 advances the opening timing of the intake valves 54 to thereby strengthen the swirl flow formed by the combustion chamber E, realized to set a larger amount of injection of fuel injected in the pilot injection than that in a case where the opening timing of the intake valves 54 is not advanced.

Figure 8A:
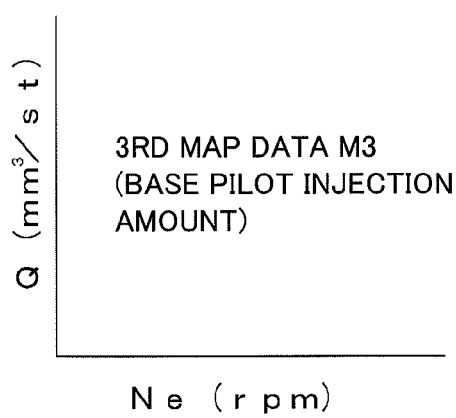
FIG. 8 is a diagram of map data of the amount of injection.
Figure 8B:
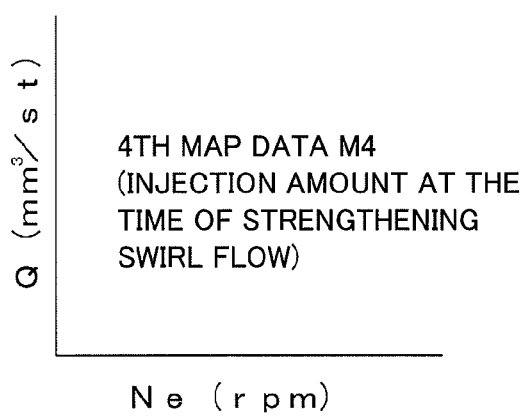

FIG. 8 shows map data M3 and M4 owned by the ECU 70B. FIG. 8(*a*) shows third map data M3 and FIG. 8(*b*) shows fourth map data M4. The injection amount set by the fuel amount setting part is specifically predetermined by the map data M3 and M4. The third map data M3 defines a fuel amount with the intake air amount Q and the engine speed Ne, which amount is a base pilot injection amount. The fourth map data M4 sets an injection mount with the intake air amount Q and the engine speed Ne at the time of strengthening the swirl flow. As to the map data M3 and M4, the injection amount defined by the fourth map data M4 is larger than that defined by the third map data M3 with the equal intake air amounts Q and the engine speeds Ne.

In this regard, the fuel amount setting part is realized as described below. That is, in the case where the intake-side VVT 57 does not advance the opening timing of the intake valves 54, the injection amount setting part refers to the third map data M3 with the intake air amount Q and the engine speed Ne. Then, the corresponding fuel amount is read and set. In the case where the intake-side VVT 57 advances the opening timing of the intake valves 54, the injection amount setting part refers to the fourth map data M4 with the intake air amount Q and the engine speed Ne. Then, the corresponding fuel amount is read and set.

Figure 9:
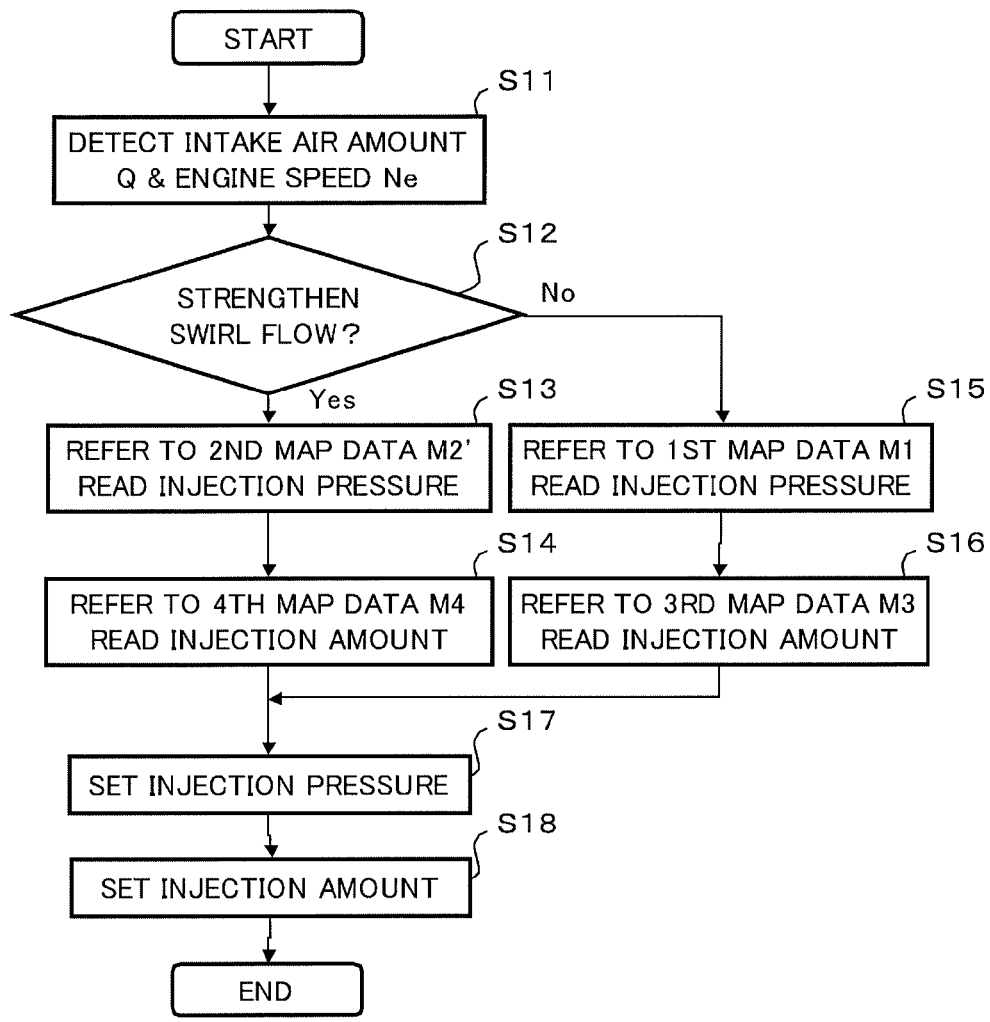
FIG. 9 is a flowchart of a second operation.

Now, a description is given of an operation of the ECU 70B, which is a second operation, with reference to a flowchart of FIG. 9. The ECU 70B detects the intake air amount Q and the engine speed Ne (step S11). Next, the ECU 70B determines whether the swirl flow is strengthened by the intake-side VVT 57 (step S12). A determination as to whether the swirl flow is strengthened may be made by, for example, determining whether the intake-side VVT 57 advances the intake valves 54 in a case where the internal combustion engine 50 is under partial load.

When a negative determination is made at step S12, the ECU 70B refers to the first map data M1 with the detected intake air amount Q and the detected engine speed Ne, and reads the corresponding injection pressure (step S15). Further, the ECU 70B refers to the third map data M3 and reads the corresponding injection amount (step S16). When a positive determination is made at step S12, the ECU 70B refers to the second map data M2' with the detected intake air amount Q and the detected engine speed Ne, and reads the corresponding injection pressure (step S13). Further, the ECU 70B refers to the fourth map data M4 and reads the corresponding injection amount (step S14).

Subsequent to step S14 or S16, the ECU 70B sets the injection pressure read at step S13 or S15 in the fuel injection pressure (step S17). Further, the ECU 70B sets the injection amount read at step S14 or S16 in the fuel injection amount at the time of the pilot injection (step S18).

In a case where the injection pressure of fuel injected by the fuel injection valve 56 is set higher as the amount of advance of the opening timing of the intake valves 54 is larger, subsequent to step S13 or S14, the ECU 70B changes the injection pressure read from the second map data M2' in accordance with the amount of advance, and sets the changed injection pressure in the fuel injection pressure at step S17.

Figure 10A:
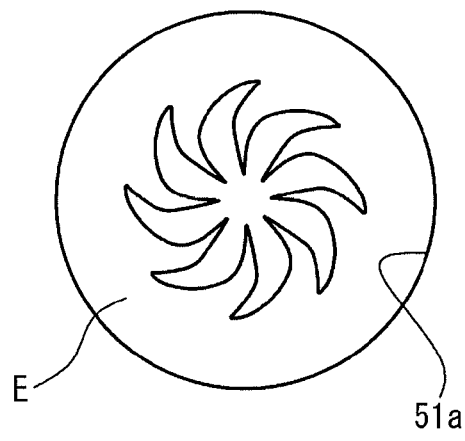
FIG. 10 is a diagram of fuel sprays at the time of strengthening the swirl flow.

Now, functions and effects of ECU 70B are described. FIG. 10 is a diagram that describes fuel sprays at the time of strengthening the swirl flow. FIG. 10(*a*) shows a fuel spray in the case where the injection pressure read from the first map data M1 is set in the fuel injection pressure at the time of strengthening the swirl flow. FIG. 10(*b*) shows a fuel spray in the case where the injection pressure read from the second map data M2' is set in the fuel injection pressure at the time of strengthening the swirl flow.

As illustrated in FIG. 10(*a*), in the case where the injection pressure read from the first map data M1 is set in the fuel injection pressure at the time of strengthening the swirl flow, the spray of fuel injected radially is drifted by the swirl flow, and the fuel spray is thus arranged unevenly in the proximity of the center of the combustion chamber E. Therefore, the air in the whole combustion chamber E is not utilized and smoke degradation is incurred.

Figure 10B:
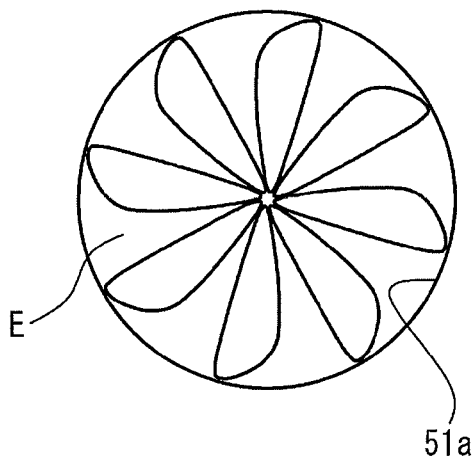

In contrast, in the case where the intake-side VVT 57 advances the opening timing of the intake valves 54 to thus strengthen the swirl flow, the ECU 70B sets the injection pressure read from the second map M2' in the fuel injection pressure. Thus, the fuel injection pressure is set higher than that for the case where the intake-side VVT 57 does not advance the opening timing of the intake valves 54 (the case where the injection pressure read from the first map data M1 is set). Therefore, the ECU 70B is capable of appropriately arranging the fuel spray at the time of strengthening the swirl flow by the operation of the intake-side VVT 57 as illustrated in FIG. 10(b). Therefore, smoke can be reduced specifically.

The ECU 70B sets the injection pressure of fuel injected by the fuel injection valve 56 to a higher level as the amount of advance of the opening timing of the intake valves 54 is larger, and is thus capable of appropriately arranging the fuel spray based on the strength of the swirl flow. It is thus possible to more appropriately arrange the fuel spray at the time of strengthening the swirl flow.

In the case where the intake-side VVT 57 advances the opening timing of the intake valves 54, the ECU 70B sets the amount of fuel injected in the pilot injection larger than that for the case the intake valves 54 are not advanced. Thus, the ECU 70B is further capable of suppressing degradation of combustion noise because of increased fuel injection pressure.

In a case where the internal combustion engine 50 is under partial load including at least medium load, the intake-side VVT 57 advances the opening timing of the intake valves 54, so that the swirl flow can be strengthened to a large degree. In the strengthening of the swirl flow, the process of advancing the opening timing of the intake valves 54 by the VVT 57 in the case where the internal combustion engine 50 is under partial load is preferably applied to the ECU 70B.

Although the embodiments of the present invention have been described above, the present invention is not limited to the specifically described embodiments but may include various variations and changes within the scope of the claimed invention.

For example, the execution of scavenging the combustion chamber in such a manner that the valve system causes the intake and exhaust valves to overlap each other is not limited to the time of acceleration of the internal combustion engine. The execution of advancing the opening timing of the intake valve by the valve system and thus strengthening the swirl flow formed in the combustion chamber is not limited to the case where the internal combustion engine is under the partial load including medium load.

DESCRIPTION OF REFERENCE NUMERALS internal combustion engine 50
intake valves 54
exhaust valves 55
fuel injection valves 56
intake-side VVT 57
exhaust-side VVT 58
ECU 70A, 70B

The invention claimed is:

1. A control device for an internal combustion engine applied to an internal combustion engine of in-cylinder injection type equipped with a fuel injection valve that injects fuel into a combustion chamber, an intake valve provided for the combustion chamber, and a valve system capable of changing an opening timing of the intake valve, a swirl flow being formed in the combustion chamber,
the control device including an injection pressure setting part that sets, in a case where the valve system advances the opening timing of the intake valve to thereby strengthen the swirl flow, injection pressure of fuel injected by the fuel injection valve lower than that for a case where the opening time of the intake valve is not advanced.

2. The control device for the internal combustion engine according to claim 1, wherein the injection pressure setting part sets the injection pressure of fuel injected by the fuel injection valve higher as the degree of advance of the opening timing of the intake valve is larger.

3. The control device for the internal combustion engine according to claim 1, further comprising an injection amount setting part that sets, in a case where the fuel injection valve performs a main injection and a pilot injection prior to the main injection and the valve system advances the opening timing of the intake valve to thereby strengthen the swirl flow formed in the combustion chamber, an amount of fuel injected in the pilot injection larger than that for a case where the opening timing of the intake valve is not advanced.

4. The control device for the internal combustion engine according to claim 2, further comprising an injection amount setting part that sets, in a case where the fuel injection valve performs a main injection and a pilot injection prior to the main injection and the valve system advances the opening timing of the intake valve to thereby strengthen the swirl flow formed in the combustion chamber, an amount of fuel injected in the pilot injection larger than that for a case where the opening timing of the intake valve is not advanced.

* * * * *